(12) United States Patent
Lioce

(10) Patent No.: US 7,192,035 B1
(45) Date of Patent: Mar. 20, 2007

(54) SHOPPING CART AND SHOPPING CART ACCESSORY

(76) Inventor: Gabriele Lioce, 2140 48th St., Astoria, NY (US) 11105

( * ) Notice: Subject to any disclaimer, the term of this patent is extended or adjusted under 35 U.S.C. 154(b) by 0 days.

(21) Appl. No.: 11/473,838

(22) Filed: Jun. 22, 2006

(51) Int. Cl.
*B62D 39/00* (2006.01)

(52) U.S. Cl. .............................. 280/33.992; 280/33.991

(58) Field of Classification Search ....... 280/33.991–2, 280/33.994–5, 33.997, 47.34–5, 79.11, 79.3, 280/79.6–7, 47.26
See application file for complete search history.

(56) References Cited

U.S. PATENT DOCUMENTS

| | | | |
|---|---|---|---|
| 2,676,054 A | | 4/1954 | Pasin |
| 2,797,851 A | * | 7/1957 | Leake ........................ 224/482 |
| 3,028,066 A | | 4/1962 | Bumby |
| 3,702,018 A | | 11/1972 | Wood |
| 5,366,123 A | | 11/1994 | Range |
| 5,615,903 A | * | 4/1997 | Spear et al. ............. 280/47.19 |
| 5,687,979 A | * | 11/1997 | Plevka ..................... 280/47.19 |
| 5,806,866 A | | 9/1998 | Fleischer |
| 5,836,596 A | | 11/1998 | Wanzl |
| 5,957,352 A | * | 9/1999 | Gares ........................ 224/401 |
| 6,139,029 A | | 10/2000 | Shaw |
| 6,193,265 B1 | * | 2/2001 | Yemini ........................ 280/653 |
| 6,481,583 B1 | * | 11/2002 | Black et al. ................ 211/70.6 |
| 6,607,229 B1 | | 8/2003 | McIntosh |
| 6,755,478 B2 | * | 6/2004 | Messinger-Rapport ......... 298/3 |
| 2002/0117591 A1 | * | 8/2002 | Accuardi ............... 248/220.31 |
| 2003/0042694 A1 | | 3/2003 | Werner |
| 2003/0052464 A1 | | 3/2003 | McGuire |
| 2005/0212234 A1 | | 9/2005 | McFarland |
| 2005/0263969 A1 | | 12/2005 | Cote et al. |

* cited by examiner

*Primary Examiner*—Christopher P. Ellis
*Assistant Examiner*—Vaughn T. Coolman
(74) *Attorney, Agent, or Firm*—Steven Horowitz

(57) ABSTRACT

An improved shopping cart, the improvement comprising a pair of brackets attached to the side of the cart. One of the brackets is positioned towards a front of the cart, while the other is positioned towards a rear. Each bracket comprises a rigid straight inner attachment slab attached to the basket, and an L-shaped slab. The L-shaped slab has a horizontal portion, a horizontal portion and a vertical portion having a free upper end. A non-curved or boxy U-shaped portion of the bracket is formed by an intersection of the horizontal portion, a lower part of the vertical portion and a second middle portion of the straight inner attachment slab. The brackets are spaced apart sufficiently to allow a long object to rest securely on the U-shaped portion of each bracket. Present invention also includes the removable accessory variant of the same improvement.

10 Claims, 5 Drawing Sheets

SHOPPING CART AND SHOPPING CART ACCESSORY

FIELD OF THE INVENTION

The field of this invention is shopping carts, and more particularly, an improved shopping cart with brackets for carrying long narrow objects.

BACKGROUND OF THE INVENTION AND DISCUSSION OF THE PRIOR ART

Most shopping carts on the cart market and on supermarket floors today are ill-equipped for transporting the long heavy loads, such as wooden boards or narrow furniture boxes. In recent years, with the rapid spread of warehouses and home improvement stores such as Home Depot, Home Expo, Ikea, etc., that sell construction supplies and boxed disassembled furniture, the problem of inefficient carts has become more acute than ever.

Most of such home improvement stores offer their customers regular carts with a large basket and virtually no additional storage. When customers pick up long heavy objects from the shelves, they have to improvise by placing them on carts not intended for the accommodation of such items. Some customers place long flat objects on the top of the basket, resting them on the front rim of the cart and the handle. But often the front rims of the basket are of varying height. This difference in height causes the long heavy objects to slide down when the cart is moving or when the customer or a by-passer accidentally pushes the protruding item. Since there are no rims on the sides of most carts, the object can slide off the top of the cart in any direction. This is extremely dangerous and can cause not just the breakage of the product and damage to the store, but also serious injury to customers. It is then hard to accommodate the placement of small children who came shopping with their parents since if they stand next to a cart loaded in such a manner, a box or a wooden log falling off the top of the basket can easily cause severe injury.

Some carts have a section under the cart, on top of the wheeled base, specifically devoted to the placement of heavy items (such as the bags of rice, or boxes of bottled water). However, the presence of such under-the-cart compartments necessarily requires a compromise in design. If the under-the-cart compartment is made larger, the size of the main basket necessarily has to decrease. Therefore, the under-the-cart compartment is usually of limited height and length. Because of the limited size of such compartments, many long and wide boxes do not fit into this very limited under-cart space. Even if they do fit, a significant length of the object protrudes from the back and the front of the under-cart space. The object protruding from the back of the cart extends to the area where normally the legs of the customer pushing the cart would be. This protrusion not only makes pushing the cart awkward for the customer, but may also result in tripping and injuries of the same.

Some stores allow customers to use special platforms on wheels for large loads. Often such platforms have no handles and are uncomfortable to move and keep an object steadily balanced on. Furthermore, even if the consumer has access to such platform carts and even if such carts are comfortable and usable by regular consumers, there is still a significant problem. If a customer intends to buy anything other than the long bulky object, he must use a regular cart in addition to the special platform cart. Pushing two carts on a shopping trip, especially with one of the carts being of a handle-less platform variety is a joyless experience for the customer pushing the carts, as well as a dangerous one for other customers who happen to be on the multi-cart-pusher's way. Merchandise accidentally shoved off the shelves and jammed aisles only makes the experience of pushing two carts at once that much worse. So, instead of juggling the carts, most consumers prefer to use just one of the carts at a time. Some would then return with another cart to pick up the items of the shape not fitting into the first cart. Because of the inconvenience associated with leaving one cart unattended and retracing the trip around the store to pick the remaining items, many customers will not return with the second cart and will not buy the merchandise they planned to buy or would have intuitively put into the cart. This leads to decreased sales. Over the course of time, inconveniences to customers resulting from inefficient shopping carts can easily amount to millions of dollars in losses.

Some solutions in the prior art suggest creating a level upper surface of the basket for placing long items on top of such leveled basket. But the use of such adapters does not solve most of the problems described above. In particular, the object would still be prone to falling off the height of the cart, creating a hazard for children. Placing long items on top of the leveled basket would still cause a significant part of the item to extend rearward, where the pusher of the cart is located. The extending object would prevent or seriously interfere with customer approach to the rear of the cart and the use of the handle, thus creating inconvenience and awkwardness of use. Furthermore, the rear cart handle is used as a break on some models of carts. Placement of heavy objects over such break-handle would stall the cart in place.

Placement of most large items over the top of the cart will also cover the basket and interfere with customer placing smaller-shaped items into the cart. This would create the whole range of inconveniences to the customer and loss of sales to the stores, as described above.

Another solution in adopting a shopping cart for carrying long items is described in McGuire (US 2003/0052464A1), which is an elongated flexible holder attached to the exterior of the shopping cart's basket. However, the holder, being constructed of flexible material is prone to wear in everyday supermarket use, particularly at points of attachment to the cart. Heavy items may cause the holder to open. Furthermore, the width and girth of the items that can fit into the holder are limited and have to be predetermined at the time of construction. Such solution is suitable only for slender items, but not for wide, long, heavy boxes.

More complex solutions exist that attempt to address the problems of long items extending over the handle of the cart or into the leg-space of the pusher by placing the long heavy loads on flat platforms, open in the front and the rear, or extending along the side of the cart. Most of such solutions create additional space on the side of the cart at a cost of decreasing the size of the cart's basket.

Furthermore, the existing solutions for placing large heavy loads along the side of the basket are difficult or impossible to incorporate into existing shopping carts. A store, wishing to avoid the problems associated with carrying long heavy loads on regular carts has to get rid of its existing, often large and very expensive fleet of shopping carts and replace it with a fleet of redesigned, much more expensive shopping carts. Such a solution may be too costly to be practical for most stores.

Another problem is that side accessories to carry long bulky items may extend too far outward, thereby causing traffic problems in the store. The solution of making the side accessories adjustable renders the design much more complex and expensive.

In general, the complex designs of the prior art also render adapting the fleet of shopping carts too costly. But the purchase price and constant maintenance costs, that complex designs of prior art require, may not be the end of store's expenses if it elects to replace the regular carts with redesigned carts that have platforms at the side. If down the road, the store decides to stop or reduce the sale of long bulky items, the store would be left with a large inventory of carts having smaller baskets and having platforms extending from the sides. If the owner of the store decides to sell the premises with equipment (including carts) to another store, as often happens, the redesigned carts may become a burden. Unless the purchasing chain sells many long heavy objects, the specialized carts may be of little or no value to it, thereby reducing the value of the premises. Moreover, altering the cart to delete the portions of the cart specifically adapted for long bulky items, if possible at all, would require much time and effort.

Therefore, what is needed is a solution for a cart that can accommodate both the long bulky items, as well as the small products, best fitting into a regular shopping cart. The accommodation of long items must be such that the object, once placed into the cart, does not protrude into the legspace of the cart pusher and does not interfere with the use of the cart handle. The solution must be durable and maintenance-free. Most importantly, the solution must be simple, inexpensive to produce, and simple for stores to adopt for use in their existing carts, without negatively affecting the resale value of the cart.

The present invention achieves all of these objectives, while also providing numerous additional benefits.

SUMMARY OF THE PRESENT INVENTION

The present invention improves the shopping cart of the kind usually found in specialty stores like home depot. The kind of carts further improved by this invention usually comprises a rigid cart frame, a base a handlebar and a basket. The basket is usually located above the base. The base connects rotatable wheels in the front and rear of the cart. The handlebar on such carts usually extends from a top area of a frame rear.

The improvement of such carts, provided by the present invention is embodied in a pair of brackets rigidly attached to a left side and/or to a right side of the cart. One of the brackets of the pair of brackets is usually positioned towards a front of the cart, while a second of the brackets of the pair of brackets is positioned towards a rear of the cart. Both brackets of the pair of brackets are attached on a same side of the cart. Another pair of brackets may be attached to another side of the cart for increased load capacity.

Each bracket comprises a rigid generally straight inner attachment slab that is either integrated and hence rigidly attached to the basket of the cart or, in the portable version, attaches removably to a top of the basket of the cart, such as by having the top of the bracket shaped into a hook that rests on the top of the basket.

Each bracket also comprises an L-shaped slab. The L-shaped slab has a horizontal portion for rigid attachment to the inner attachment slab at a first middle portion of said inner attachment slab. The L-shaped slab also has a vertical portion that represents the outer portion of the accessory. The vertical portion generally has an upper free end. The intersection of the horizontal portion, a lower part of the vertical portion and a second middle portion of the straight inner attachment slab form a boxy U-shaped portion of the bracket. Said boxy U-shaped portion accepts and supports long narrow heavy objects.

Each bracket of the pair of brackets is positioned so that the horizontal portion of each bracket of the pair of brackets on any side of the cart is substantially collinear with each other. Each bracket of the pair of brackets is also spaced sufficiently apart to allow an object having a length at least as long as a length of the cart to rest securely on an area of each bracket formed by the intersection of the horizontal and vertical portions of the L-shaped slab and a middle portion of the inner attachment slab.

The present invention also includes the removable accessory embodiment of the above-described improvement. In this embodiment, a brace connects each bracket of the pair of brackets. The brace comprises at least one rigid crossbar. Preferably, the brace comprises a horizontal crossbar and two diagonal crossbars. The diagonal crossbars intersect to form an "x".

In a preferred embodiment, a bottom portion of the straight inner attachment slab ends substantially in the form of an upside down L, for placement alongside and wrapping around the inside of a long crossbar of the base and thus preventing the wobbling of said brace.

IMPORTANT OBJECTS AND ADVANTAGES

The following important objects and advantages of the present invention are:

(1) To provide an improved shopping cart that allows for transportation of long heavy objects;

(2) To provide an improved shopping cart for transport of long heavy objects that retains access to a full-sized shopping basket;

(3) To provide an improved shopping cart for transport of long heavy objects that is safe to use;

(4) To provide an improved shopping cart for transport of long heavy objects that allows for the use of a cart basket, while the cart is loaded with long heavy objects;

(5) To provide an improved shopping cart for transport of long heavy objects that is simple, inexpensive to produce and inexpensive to integrate into the design of existing shopping carts;

(6) To provide such an improved shopping cart whose improvement comprises a limited number of simple parts;

(7) To provide such an improved shopping cart whose improvement in certain embodiments comprises only two different parts for each of two identical brackets;

(8) To provide an improved shopping cart for transport of long heavy objects that allows the placements of objects in such a way that they do not extend into the leg space of the pusher;

(9) To provide an improved shopping cart for transport of long heavy objects that allows for placement of objects in such a way that they do not interfere with the use of the handle;

(10) To provide such an improved shopping cart that provides a secure place for the long objects to rest;

(11) To provide a removable and portable apparatus for transport of long heavy objects that is durable;

(12) To provide such an apparatus for transport of long heavy objects that can be made out of inexpensive materials, such as plastic;

(13) To provide such an apparatus for transport of long heavy objects that is maintenance-free;

(14) To provide such an apparatus for transport of long heavy objects that is adaptable for use on most of existing shopping carts;

(15) To provide such an apparatus for transport of long heavy objects that is easy to remove from the cart;

(16) To provide such an apparatus comprising a limited number of simple parts;

(17) To provide such an apparatus comprising in certain embodiments only two different parts for each of two identical brackets;

(18) To provide such an apparatus that provides a secure place for the long objects to rest.

DETAILED DESCRIPTION OF THE PREFERRED EMBODIMENT

Figure 1:
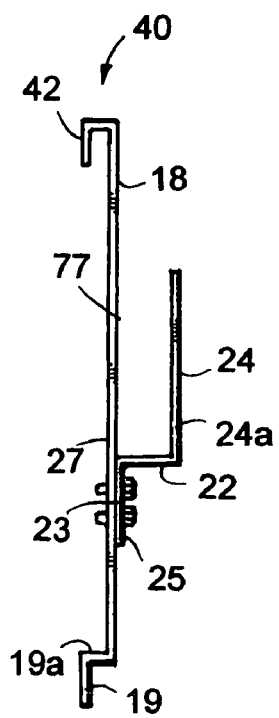
FIG. 1 is a side view of a bracket of the pair of brackets constituting the improvement in the shopping cart of the present invention.
Figure 2:
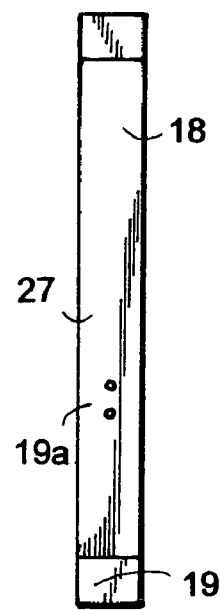
FIG. 2 is a rear view thereof.

The apparatus of the present invention will now be illustrated by reference to the accompanying drawings. Preferred embodiments of the improved shopping cart of the present invention have been assigned reference numeral 10. Other elements have been assigned the reference numerals referred to below.

The shopping cart 10 improves the regular shopping cart of the kind usually found in department stores. The kind of carts improved by the invention is well-known to all American supermarket shoppers and usually comprises a rigid cart frame, a base 7, a handlebar 9 and a basket 8. The basket is usually located above the base. In most types of carts, the basket is the largest and most prominent structure of the cart. Ideally, the stores are striving to provide the basket of the largest possible proportions to allow the shopper to fit all kinds of merchandise offered by the store, and also to create the impression that the merchandise inside of the basket is not filling the basket to convince the purchaser to add more merchandise to the cart. The size of the basket is, however, limited by the price of the cart and width of store aisles. The base of the cart usually connects rotatable wheels in the front and rear of the cart. The handlebar on such carts usually extends from a top area of a frame rear.

As seen from FIGS. 1–8, the present invention provides a further improvement of such carts either in the form of an integrated accessory or in the form of a removable and portable accessory. For the integrated version that constitutes a new improved shopping cart, the improvement is embodied in a pair of brackets 12 rigidly attached to a left side and/or to a right side of the cart 10.

One of the brackets of the pair of brackets 12 is usually positioned towards a front of the cart and will consequently be referred to as the front bracket 14. The second of the brackets of the pair of brackets is positioned towards a rear of the cart and will consequently be referred to as the rear bracket 16. Both brackets of the pair of brackets 12 are attached on a same side of the cart 10. Each bracket of the pair of brackets 12 is positioned substantially parallel to the other bracket of the pair of brackets. Furthermore, each bracket of the pair of brackets is spaced apart sufficiently to allow an object having a length at least as long as a length of the cart to rest securely on a boxy "U"-shaped area of each bracket described further below.

The purpose of the brackets is to provide horizontal support for long narrow beams, logs, furniture boxes, etc. that due to their length do not fit into the basket of the cart.

In the preferred embodiment the front bracket 14 is positioned as far as possible towards the front of the cart 10, while the rear bracket 16 is positioned as far as possible towards the rear of the cart 10. The greatest possible distance between the front bracket 14 and the rear bracket 16 provides for improved balance of long objects that exceed the length of the cart. In certain alternative embodiments of the removable accessory version, the brackets can be manually rearranged to be closer to each other to accommodate shorter objects.

Figure 5:
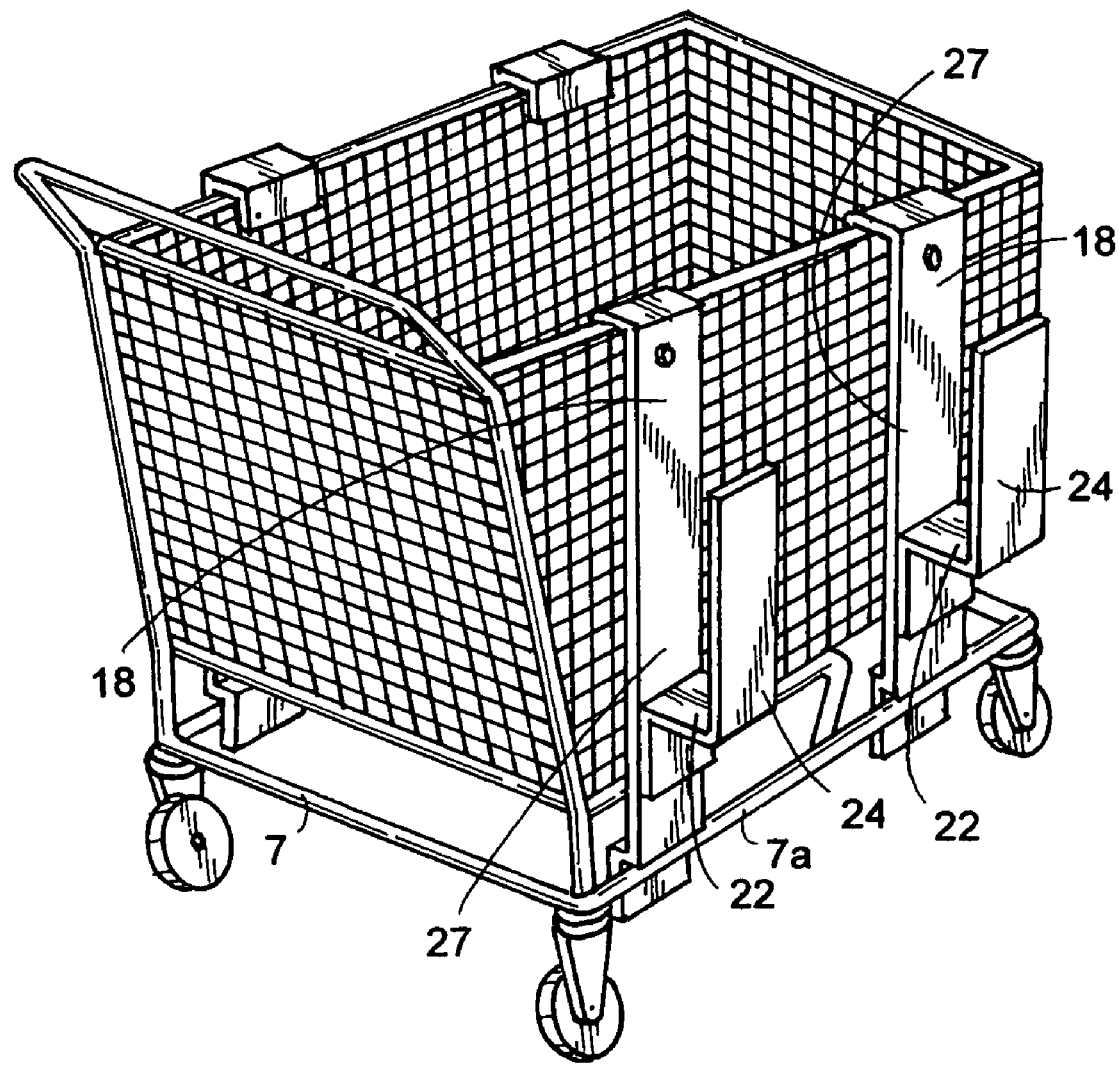
FIG. 5 is a perspective view of the improved shopping cart of the present invention showing two pairs of integrated brackets representing the improvement.
Figure 6:
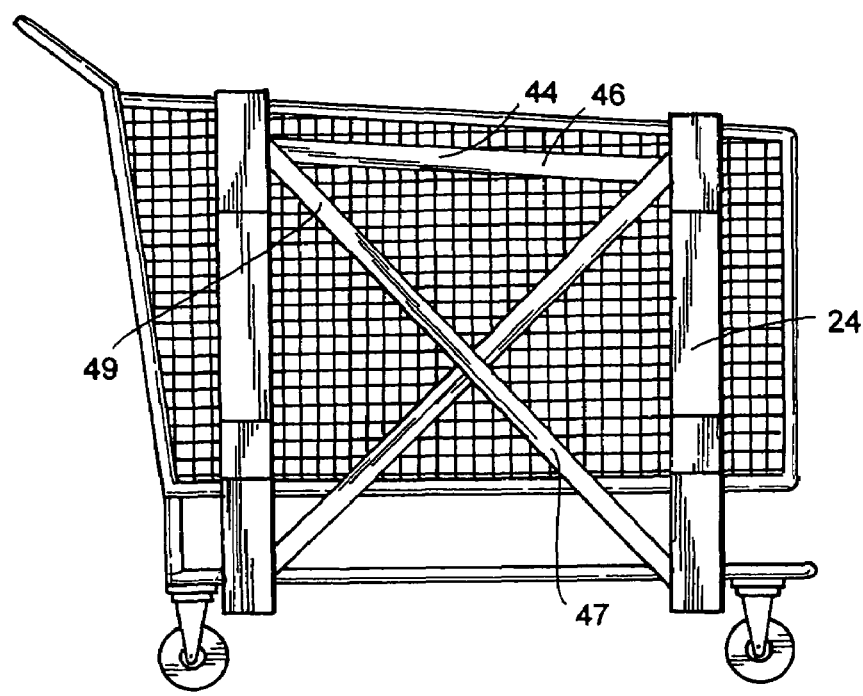
FIG. 6 is a side view of a portable accessory of the present invention attached to a side of a shopping cart.
Figure 7:
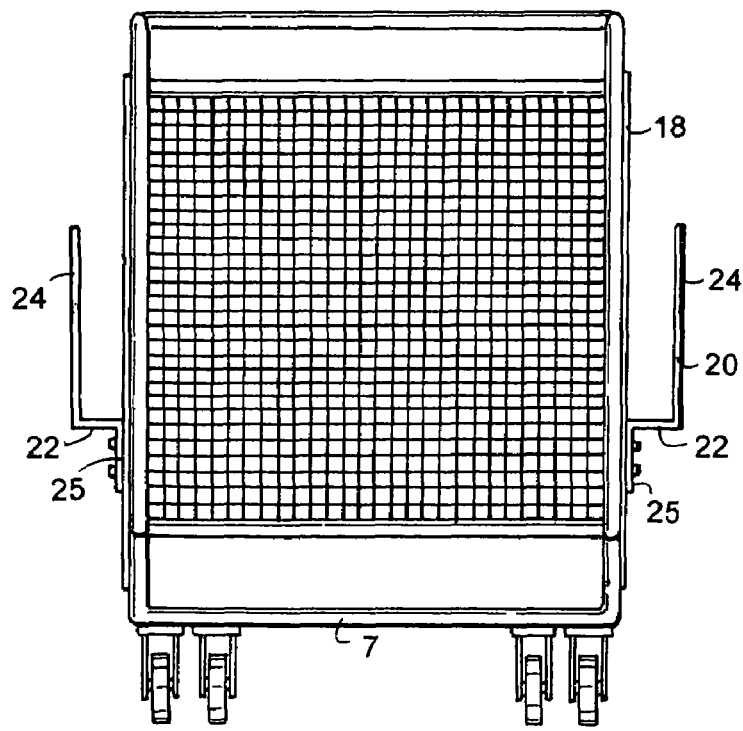
FIG. 7 is a rear view of the portable accessory and the shopping cart shown in FIG. 6.

Each bracket 14, 16 of the pair of brackets 12 comprises a rigid and generally straight inner attachment slab 18. The rigid straight inner attachment slab 18 rigidly attaches to the basket. In a preferred embodiment said attachment takes place at the top of the basket, although it need not. Moreover, in certain preferred embodiments also wraps around a crossbar of the base, as seen in FIG. 5. Various attachment methods, well known to those skilled in the art, can be used for attachment of the inner attachment slabs 18 to the basket. For example, the rigid straight inner attachment slab can be permanently welded to the side of the cart, affixed with nuts and bolts 99 (see FIG. 5), inserted into grooves on the side of the cart or otherwise affixed directly or indirectly to the frame and/or the basket of the cart.

Each bracket 14, 16 of the pair of brackets 12 in all embodiments herein are preferably made of metal. This metal is, in certain preferred embodiments, coated with a scratch-proof plastic.

Each bracket of the pair of brackets 12 also comprises an L-shaped slab 20. The L-shaped slab 20 includes a horizontal portion 22. The horizontal portion 22 is rigidly attached to what is referred to as the first middle portion 23 of the inner attachment slab 18, thus holding the entire L-shaped slab 20 connected to the inner attachment slab 18. The L-shaped slab 20 also comprises a vertical portion 24. Vertical portion 24 has an upper free end 26. The intersection of horizontal portion 22, vertical portion 24 (or at least a lower part 24a of said vertical portion 24) and a second middle portion 27 of the straight inner attachment slab 18 form a boxy U-shaped portion 77 of the bracket 14, 16.

The second middle portion 27 referred to is so-called because it is located above the first middle portion 23 of the straight inner attachment slab. Said U-shaped portion 77 is intended for receiving and securely supporting long narrow heavy objects.

The horizontal portion 22 can be connected to the inner attachment slab 18 in a variety of ways well known to those skilled in the art. For example on one of the preferred embodiments the parts are welded together. Alternatively, in another preferred embodiment, the inner attachment slab 18 and the L-shaped slab 20 are completely integrally connected to each other, forming together what looks like a large hook-shaped structure. Integral connection may be preferred when the inner attachment slab 18 and the L-shaped slab 20 are made of the same material. Integral connection is usually more reliable and can be cheaper to produce. For example, simple mechanized stamping, requiring no manual labor, can be used to mass-produce brackets.

Figure 3:
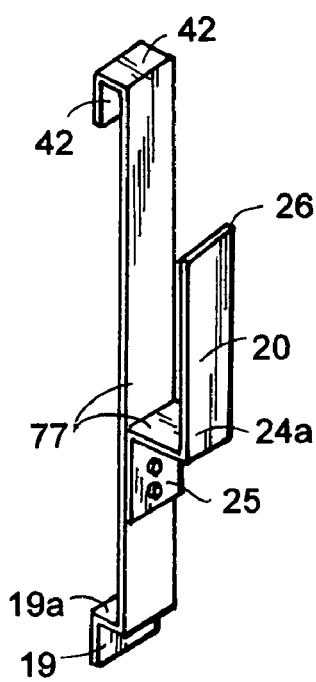
FIG. 3 is a perspective view thereof.
Figure 4:
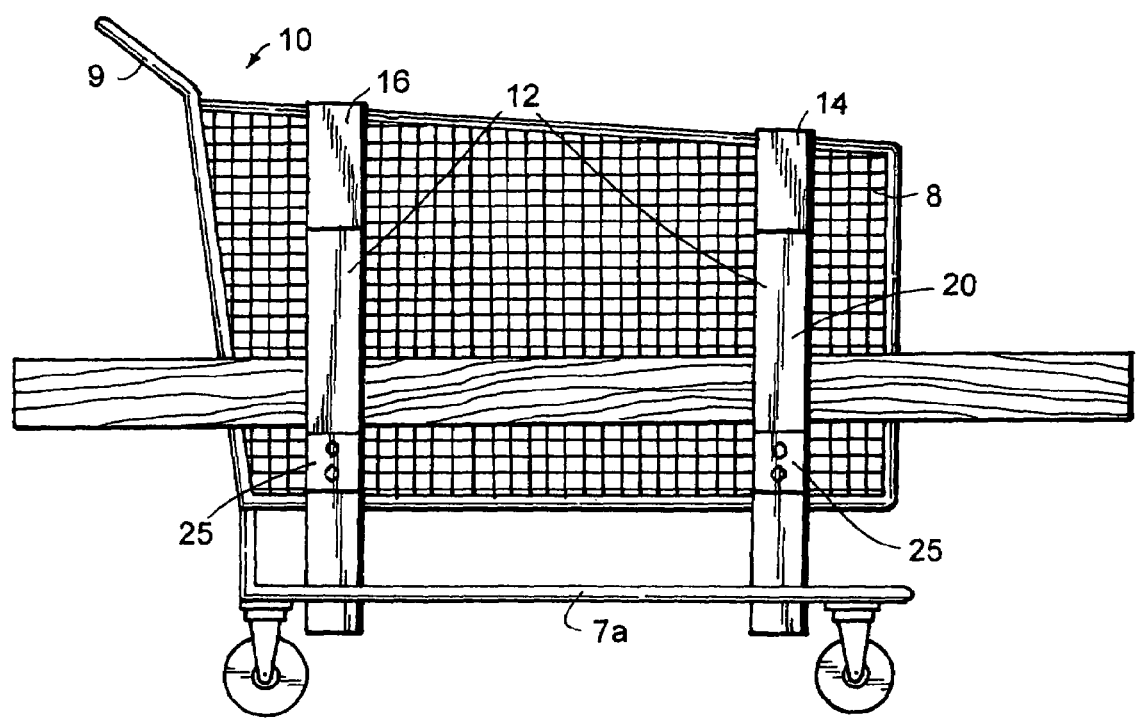
FIG. 4 is a side view of the improved shopping cart of the present invention holding a long beam.

In certain embodiments, where L-shaped slab 20 is welded or otherwise attached non-integrally to inner attachment slab 18, L-shaped slab may have a downward extension piece 25 as best seen in FIGS. 1, 3, 5. This extension piece 25 would then be used to bolt or otherwise attach L-shaped slab 20 to inner attachment 18 at the first middle portion 23 of said inner attachment slab 18.

The present invention encompasses not only the improved or modified shopping cart 10 as described with the pair of brackets on one or both sides, but also another embodiment functioning as an accessory for a shopping cart. The accessory is a removable accessory 40 that may be used on shopping carts. In this embodiment, where the present invention is a removable accessory, the structure of the pair of brackets 12 is generally the same as described above, but with some modifications. In the accessory 40 version, a top portion of the straight inner attachment slab forms a hook 42 for removable attachment to the basket.

Furthermore, instead of the brackets of the pair of brackets 12 connecting directly to the cart, a brace 44 connects each bracket of the pair of brackets 12. This brace 44 comprises at least one rigid crossbar 46. In the preferred embodiment, brace 44 comprises a horizontal crossbar 46 and two diagonal crossbars 47, 49, forming an "x." The horizontal crossbar 46 in certain embodiments runs across the top of the cart which is also at the top of the "x" and provides further reinforcement of the brace 44. Thus, in the embodiment where the present invention is a removable accessory 40, each pair of brackets 12 together with brace 44 form a single rigid structure.

Especially in the preferred embodiment of the removable accessory 40, for further stability, a bottom portion 19 of the straight inner attachment slab 18 ends substantially in the form of an upside down L, for wrapping around the inside of a crossbar 7a of the base 7 of the cart. The horizontal portion 19a of bottom portion 19 of straight inner attachment slab 18 rests on the crossbar of the base of the cart and the vertical portion 19b of the upside down L abuts this crossbar of the base on its inside. This is best seen from the drawings, and in particular FIGS. 3, 5 and 8.

The combination of the hook 42 at the top of inner attachment slabs 18 and the upside down L shaped bottom portion 19 of straight inner attachment slab 18 prevents wobbling of accessory 40 forward or backwards relative to the basket thus securely locking the accessory 40 including brace 44 with the pair of brackets 12 in place on the side of the cart.

One or more pairs of brackets 12 may be installed on a single shopping cart. In one of the preferred embodiments a pair of brackets 12 is installed on the left side of the cart and a pair of brackets 12 is installed on the right side of the cart. Such positioning is ideal for most stores, as it allows for large load capacity and even distribution of weight if several long heavy items are loaded onto the cart. Other stores may elect to implement only one pair of brackets on one side of their carts in order to reduce costs and minimize the width of carts.

Figure 8:
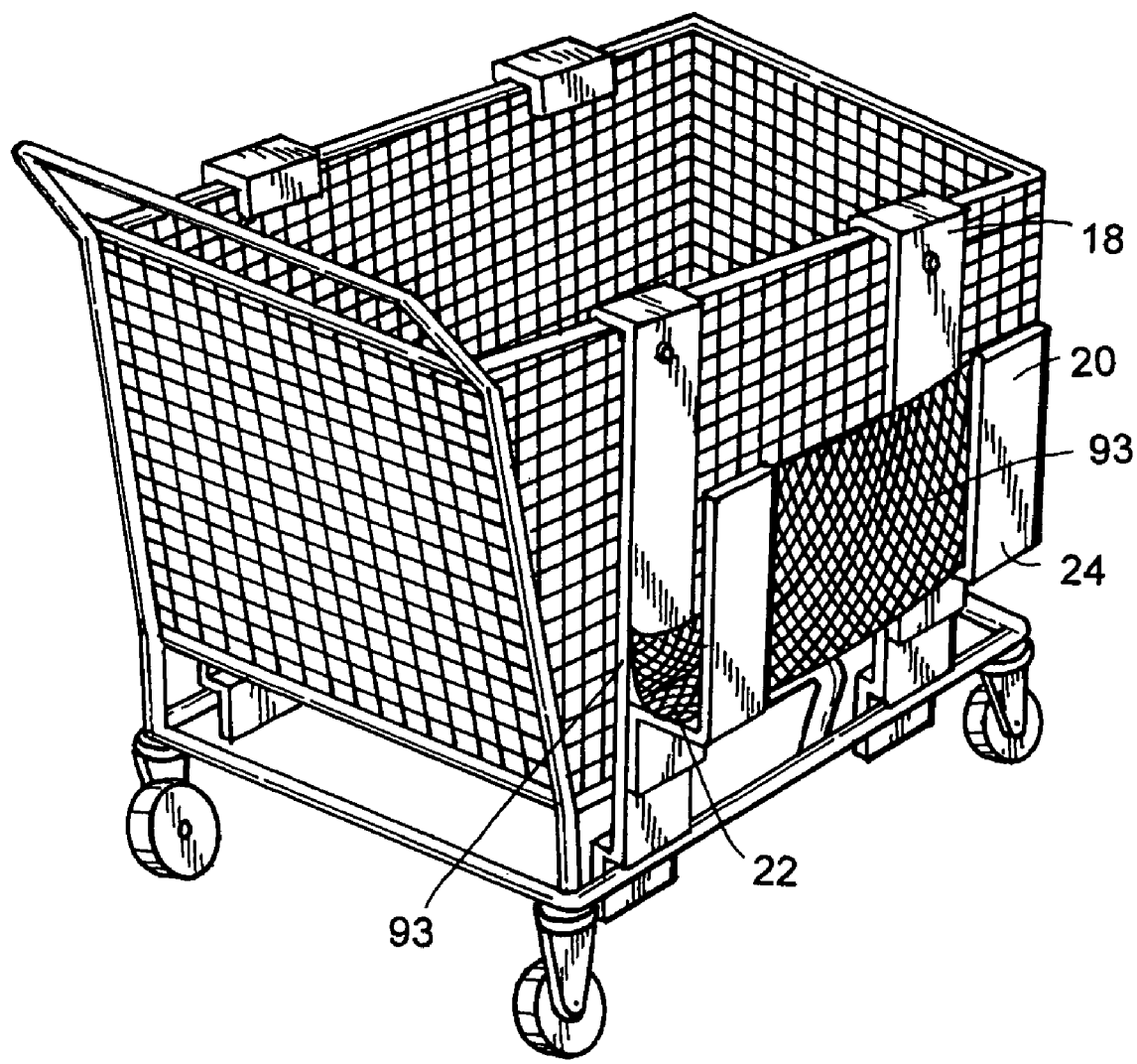
FIG. 8 is a perspective view of the portable accessory of the present invention attached to a shopping cart and including a screen.

As seen in FIG. 8, in certain preferred embodiments of the present invention, there is also a mesh screen 93, spanning the distance between the first and second brackets of the pair of brackets. The first end of the screen is located adjacent the horizontal portion 22 and at least part of the vertical portion 24 of the L-shaped slab 20 of the first bracket. The second end of the screen is located adjacent the horizontal portion 22 and at least part of the vertical portion 24 of the L-shaped slab 20 of the second bracket. In a preferred embodiment, screen 93 abuts and covers all of vertical portion 24 of L-shaped slab 20 of each bracket 14, 16 of the pair 12 of brackets.

In embodiments where there is at least one pair of brackets 12 on each side of the cart 10, a mesh screen can be attached by four corners to four brackets, thus forming a quadrangle level surface underneath the brackets. Such surface can be used as a literal "safety net" for items loaded in the brackets or serve as additional storage.

Mesh screen 93 may be included in both the removable accessory 40 embodiment and the modified shopping cart 10 embodiment. Accordingly, it should be understood that although FIG. 8 does not depict brace 44 which typically forms part of the accessory 40, accessory 40 may indeed also include mesh screen 93. Furthermore, it is certainly contemplated by the present invention that screen 93 is not limited to mesh screens but may be also be solid. Mesh screen is typically a rigid mesh screen but be any suitable screen that would effectively block an object resting on boxy U-shaped portion 77 from falling off the cart between brackets 14, 16 of pair of brackets 12.

It is to be understood that while the apparatus of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. An improved shopping cart of the kind comprising a rigid cart frame, a base a handlebar and a basket, the basket located above the base and including a right side, a left side, a front, a rear and a bottom, the base connecting rotatable wheels in the front and rear of the cart, the handlebar extending from a top area of a frame rear, the improvement comprising:

a pair of brackets rigidly attached to a left side and/or to a right side of the cart, wherein a first bracket of the pair of brackets is positioned towards a front of the cart and a second bracket of the pair of brackets is positioned towards a rear of the cart, the first and a second bracket of the pair of brackets attached on a same side of the cart, wherein each bracket of the pair of brackets comprises a rigid straight inner attachment slab rigidly attached to the basket, and comprises an L-shaped slab, the L-shaped slab including a horizontal portion for rigid attachment to the inner attachment slab at a first middle portion of said inner attachment slab, and including a vertical portion, said vertical portion having a free upper end, a U-shaped portion of the bracket formed by an intersection of said horizontal portion, a lower part of the vertical portion and a second middle portion of the straight inner attachment slab, the U-shaped portion for receiving objects, the second middle portion located above the first middle portion of the straight inner attachment slab, wherein each bracket of the pair of brackets is positioned so that the horizontal portion of each bracket is substantially collinear with each other and wherein each bracket of the pair of brackets is spaced apart sufficiently to allow an object having a length at least as long as a length of the cart to rest securely on the U-shaped portion of each bracket.

2. The shopping cart of claim 1, wherein the straight inner attachment slab is also attached to the base.

3. The improved shopping cart of claim 1, wherein the inner attachment slab and the L-shaped slab are integrally connected with each other.

4. An improved shopping cart of claim 1, wherein a screen spans a distance between the first and second brackets.

5. The improved shopping cart of claim 4, wherein a first end of the screen is located adjacent the horizontal portion and at least part of the vertical portion of the L-shaped slab of the first bracket and wherein a second end of the screen is located adjacent the horizontal portion and at least part of the vertical portion of the L-shaped slab of the second bracket.

6. An improved shopping cart of claim 1, wherein a first pair of brackets is rigidly attached to the left side of the cart and a second pair of brackets is rigidly attached to the right side of the cart.

7. An accessory for a shopping cart, the shopping cart of the kind comprising a rigid cart frame, a base a handlebar and a basket, the basket located above the base and including a right side, a left side, a front, a rear and a bottom, the base connecting rotatable wheels in the front and rear of the cart, the handlebar extending from a top area of a frame rear, the improvement comprising:

a pair of brackets rigidly attached to a left side and/or to a right side of the cart, wherein one of the brackets of the pair of brackets is positioned towards a front of the cart and a second of the brackets of the pair of brackets is positioned towards a rear of the cart, both brackets of the pair of brackets attached on a same side of the cart, wherein each bracket of the pair of brackets comprises a rigid straight inner attachment slab rigidly attached to the basket, and comprises an L-shaped slab, the L-shaped slab including a horizontal portion for rigid attachment to the inner attachment slab at a first middle portion of said inner attachment slab, including a horizontal portion and including a vertical portion, said vertical portion having a free upper end, a U-shaped portion of the bracket formed by an intersection of said horizontal portion, a lower part of the vertical portion and a second middle portion of the straight inner attachment slab for receiving objects, the second middle portion located above the first middle portion of the straight inner attachment slab, a top portion of the straight inner attachment slab forming a hook for removable attachment to the basket, wherein each bracket of the pair of brackets is positioned so that the horizontal portion of each bracket is substantially collinear with each other and wherein each bracket of the pair of brackets is spaced apart sufficiently to allow an object having a length at least as long as a length of the cart to rest securely at the U-shaped portion of each bracket.

8. The accessory of claim 7, wherein a brace connects each bracket of the pair of brackets, said brace comprising at least one rigid crossbar.

9. The accessory of claim 8, wherein the brace comprises a horizontal crossbar and two diagonal crossbars, the diagonal crossbars forming an "x".

10. The accessory of claim 7, wherein a bottom portion of the straight inner attachment slab ends substantially in a form of an upside down L, for placement of the form adjacent the base.

\* \* \* \* \*